Jan. 21, 1958            H. J. EARL            2,820,523
FRONT WHEEL DRIVE VEHICLE WITH CAB-OVER-ENGINE
Filed Jan. 13, 1955            3 Sheets-Sheet 1
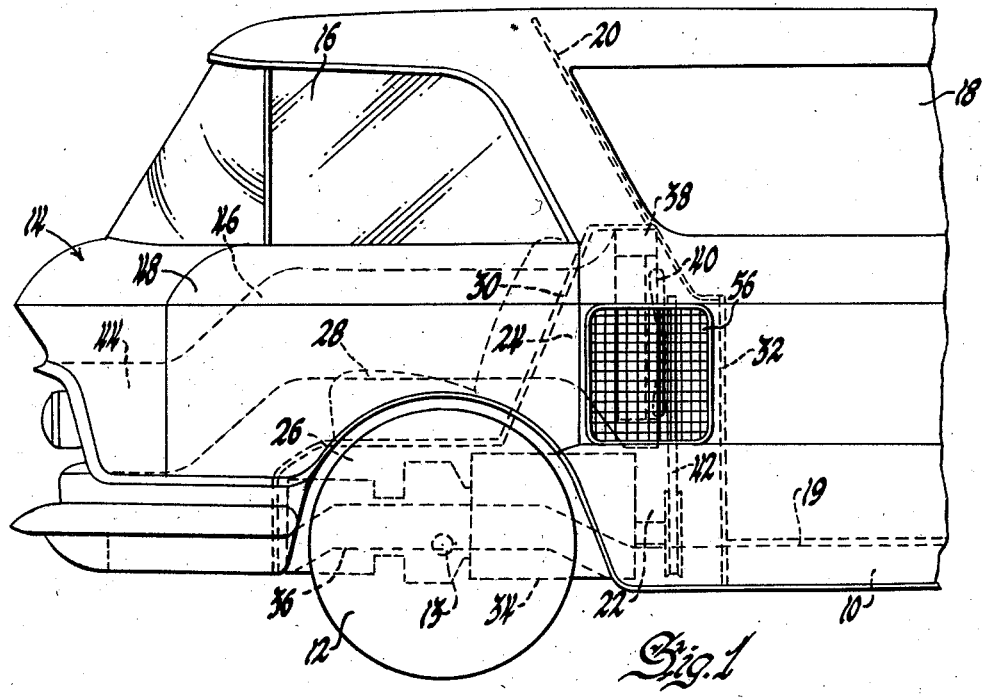
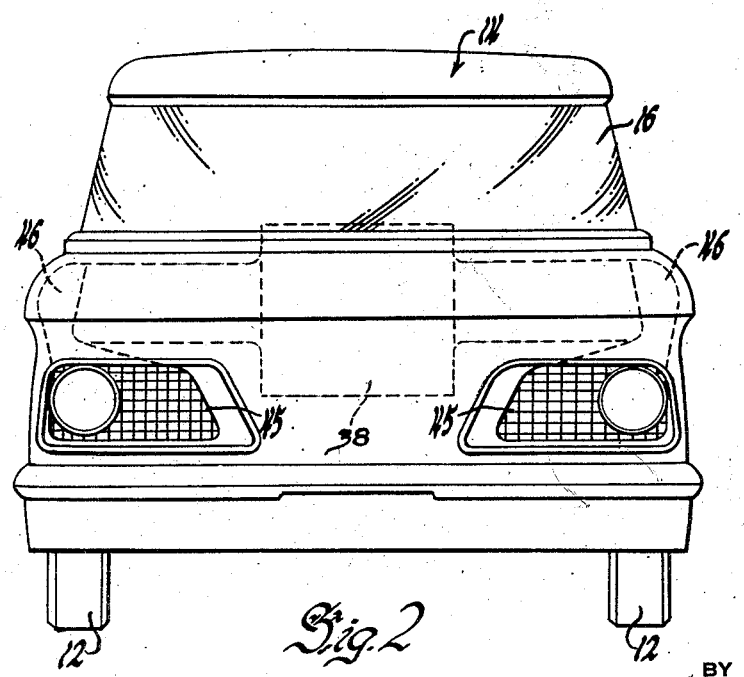
INVENTOR
Harley J. Earl
BY
S. C. Thorpe
ATTORNEY

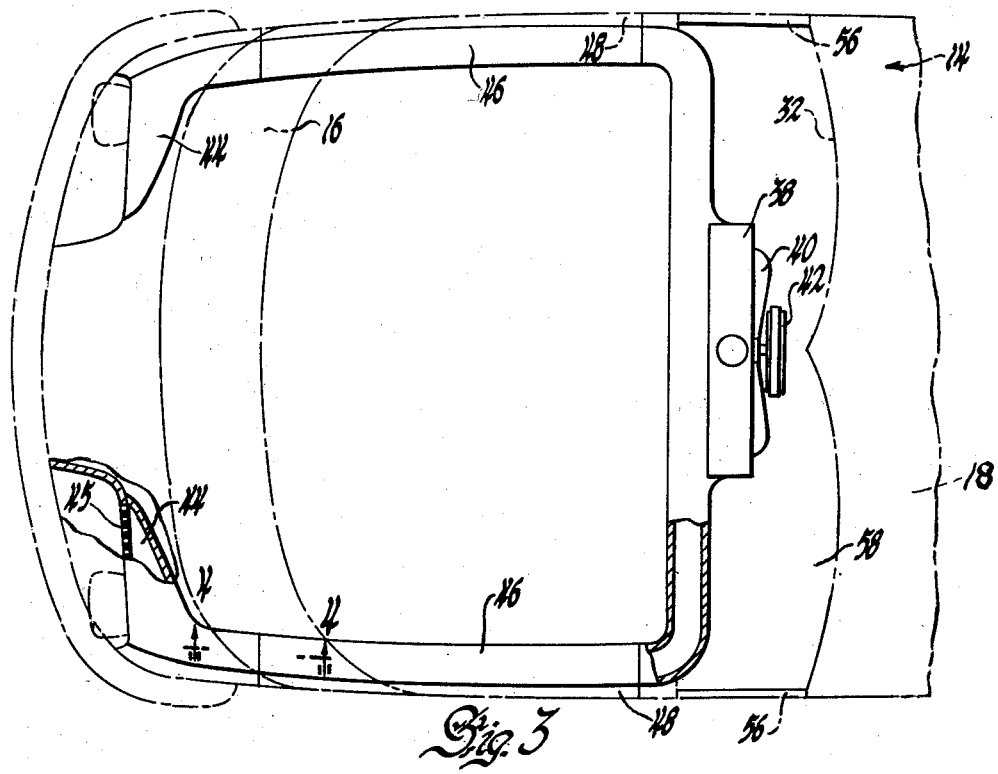
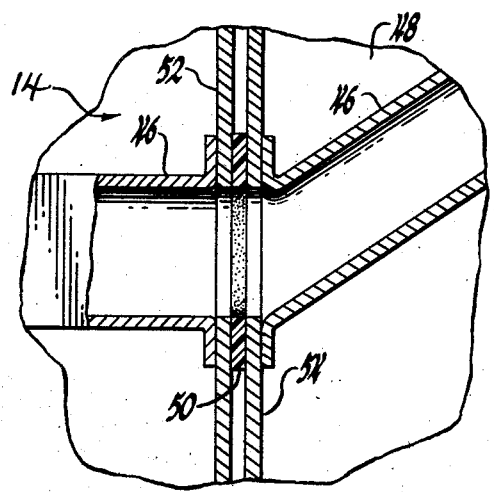

Jan. 21, 1958  H. J. EARL  2,820,523
FRONT WHEEL DRIVE VEHICLE WITH CAB-OVER-ENGINE
Filed Jan. 13, 1955  3 Sheets-Sheet 3
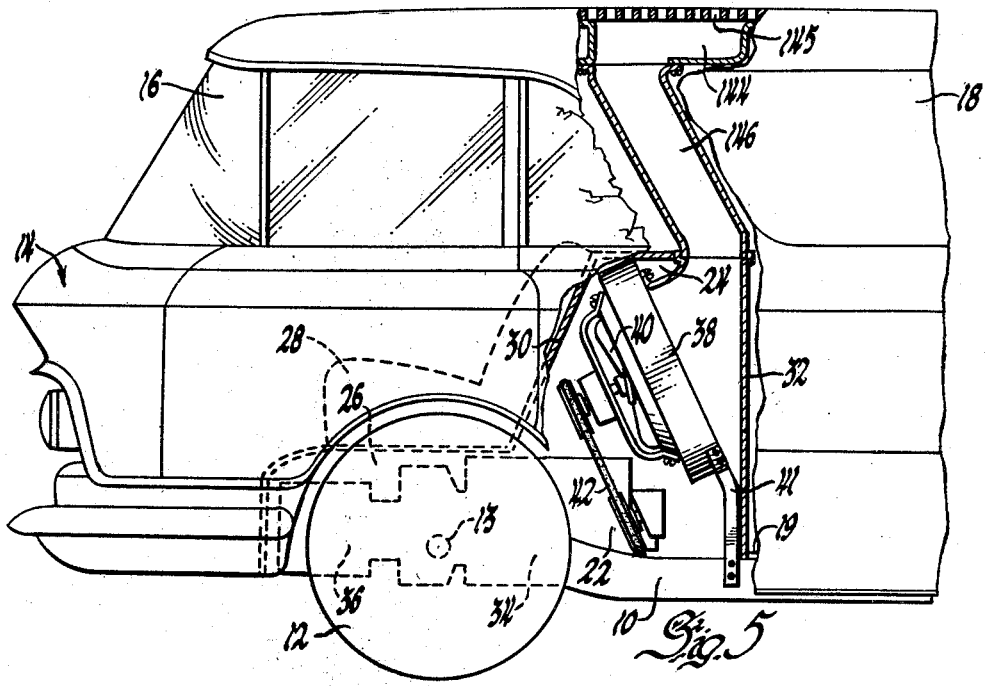
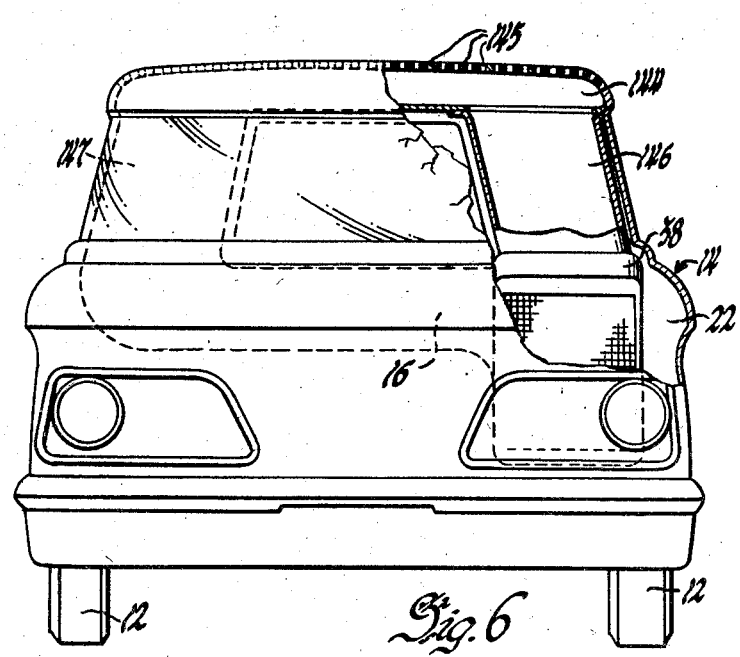
INVENTOR
Harley J. Earl
BY
S. C. Thorpe
ATTORNEY

United States Patent Office 2,820,523
Patented Jan. 21, 1958

2,820,523
FRONT WHEEL DRIVE VEHICLE WITH CAB-OVER-ENGINE

Harley J. Earl, Grosse Point Farms, Mich., assignor to General Motors Corporation, Detroit, Mich., a corporation of Delaware Application January 13, 1955, Serial No. 481,634

2 Claims. (Cl. 180—42)

This invention relates to a motor vehicle and particularly to an improved structural arrangement for a motor truck.

Among the several objects of the invention are to provide an improved structural arrangement for a motor truck permitting the lowering of the cargo-carrying truck floor relative to the ground with resultant ease of loading and lowering the center of gravity of the loaded and unloaded truck thereby improving the roadability and ease of handling of the vehicle.

The foregoing objects are achieved by providing a motor truck with an operator's cab or compartment over and extending forwardly of the front wheel axles; mounting the vehicle engine rearwardly of the front wheel axles under and behind the seat of the cab; having the transmission unit extend forwardly of the engine and drivingly interconnecting the engine with the front wheel axles; mounting the engine radiator and cooling fan to the rear of the engine behind the operator's compartment; and providing plenum means for conducting air from the atmosphere outside the vehicle to the rearwardly mounted engine cooling radiator and fan.

Further and more specific objects of the invention are to provide such plenum means to include ducts formed in the walls of the operator's compartment and to include ducts passing through the doors of the truck cab.

The foregoing and other objects and features of the invention will be more clearly understood from the following description of several preferred embodiments of the invention in which reference is made to the attached drawings, in which:

Figure 1 is a side elevational view of a truck embodying one form of the invention;

Figure 2 is a front elevational view of the embodiment shown in Figure 1;

Figure 3 is a top elevational view of the engine cooling system shown in the embodiment of Figure 1 with portions broken away and in section;

Figure 4 is a fragmentary sectional view taken substantially on the line 4—4 of Figure 3;

Figure 5 is a side elevational view similar to Figure 1 showing a modified form of the invention with portions thereof broken away and in section; and Figure 6 is a front elevational view with portions thereof broken away and in section to show the form of the invention shown in Figure 5.

Similar reference characters indicate like or corresponding parts throughout the several views of the drawings.

Referring more particularly to the drawings, Figure 1 shows the front end portion of a motor vehicle truck of the panel-delivery type. The truck has a chassis comprising a frame 10 having front wheels 12 and rear wheels, not shown, which are suitably mounted thereon by conventional suspension means, also not shown. The front wheel axles are indicated at 13. A vehicle body 14 supported by the chassis includes a compartment 16 for the operator and other occupants which extends forwardly of and above the front wheels. A second cargo-carrying compartment 18 having a floor 19 is located behind the compartment 16 and extends rearwardly of the vehicle; the upper portions of the compartments 16 and 18 being separated by a partition wall 20. The lower portions of the compartments 16 and 18 are separated by a third compartment 22 having an upper portion 24 intermediate the first two compartments and having a second lower portion 26 extending forwardly beneath a seat 28 provided for the operator and other passengers. A forward fire wall partition 30 separates the compartments 16 and 22 and a rear fire wall portion 32 separates the compartments 18 and 22.

The power plant for the vehicle is mounted in the lower portion 26 of the compartment 22 and includes a liquid-cooled internal combustion engine 34 mounted immediately behind the front wheel axles 13, and a transmission mechanism 36 extending forwardly of the engine drivingly interconnects the engine with the front wheel axles. Since no drive connection is provided between the engine and the rear wheels, the normal road and truck floor clearances for the conventional differential and torque tube are not necessary, thus permitting the members of the frame 10 to be located closer to the road and the mounting of the floor 19 directly on the frame 10. The seat 28 and the fire walls 30 and 32 are of removable construction permitting full access to the engine and transmission within the space normally comprising compartment 22. The engine 34 is preferably of a type having inclined or horizontal inline cylinder banks such as a V or pancake engine having a relatively low vertical dimension.

In the form of the invention shown in Figures 1 to 4, cooling means for the engine includes conventional cylinder and cylinder head jacketing, not shown, a radiator core 38 mounted to the rear of and slightly above the engine in the upper portion 24 of the compartment 22, and a suction fan 40. The suction fan 40 is mounted adjacent the radiator core and is driven by the engine through a conventional pulley-and-belt drive 42 thereby drawing cooling air through the core 38. Plenum means is provided for delivering air to the radiator core from the atmosphere without the vehicle and for returning the air to the atmosphere after it has been drawn through the radiator core by the fan 40. This plenum means, as best shown in Figure 3, includes twin intake chambers 44 which are located at the front of the vehicle body and have grilled openings 45 to the atmosphere. The intake chambers 44 are connected to the intake side of the radiator 38 by twin ducts 46; the ducts 46 substantially embrace the operator's compartment 16 and extend rearwardly from the chambers 44 through the side walls and doors 48 of the compartment 16 to a point immediately behind the seat 28 and then extend transversely of the vehicle toward the radiator intake. As shown in Figure 4, the segments of the ducts 46 passing through the doors 48 are sealed with respect to the segments of the duct 46 in the main body side walls by resilient grommets 50 interposed between the door jambs 52 and the door plates 54. The air drawn through the radiator core by the fan 40 is discharged to the atmosphere through twin grilles 56 mounted in the sides of the vehicle by a discharge chamber 58 formed between the rear fire wall 32 and the transversely extending portions of the ducts 46.

It is still further contemplated that the intake chamber or chambers need not be located in the front of the vehicle but may be located in the sides or top of the vehicle with scoped, louvred, or plain grille-type openings to the atmosphere. Such a modified form of the invention is shown in Figures 5 and 6 which is described in detail below.

It will be seen from Figure 5 that the radiator core 38 and the fan 40 are inclined from a vertical plane normal to the longitudinal axis of the vehicle. The core 38 is supported in this inclined position by the bracket 41 and the engine-driven belt drive 42 is inclined to accommodate this inclination. The plenum means provided in this form of the invention includes an intake chamber 144 extending transversely of the top of the vehicle body 14 between the compartments 16 and 18. The intake chamber 144 has a grilled opening 145 in the top of the vehicle body and is connected to two laterally spaced and downwardly extending legs of ducts 146 and 147; the duct 147 also having a transversely extending leg connecting with the duct 146 at the inclined intake of the radiator core. The air passing through the radiator passes directly into the compartment 22 from which it is discharged to the atmosphere below the vehicle.

From the foregoing description of two modifications of the invention, it will be seen that the invention provides an improved cab-over-engine truck design having a front wheel drive arrangement permitting the cargo-carrying floor of the vehicle to be lowered relative to the ground. This lowered floor facilitates loading and unloading of the vehicle and permits the lowering of overall vehicle height and results in the lowering of the loaded and unloaded centers of gravity with the consequential advantages therefrom.

While several specific embodiments of the invention have been shown and described for the purposes of illustration, it is appreciated that various modifications may be made without departing from the spirit and scope of the invention as defined in the following claims:

I claim:

1. In a motor vehicle of the cab over engine type, a chassis comprising a substantially horizontal frame, a front wheel axle mounted on said frame, an operator's compartment secured to said frame at the front end thereof, an engine compartment behind said operator's compartment and having a portion extending beneath said operator's compartment, a seat for the vehicle operator mounted in said operator's compartment directly above said front wheel axle, an engine mounted within said engine compartment on said frame rearwardly of said axle with the front portion of said engine extending under the rear portion of said seat, a transmission unit beneath said seat and extending forwardly of said engine and drivingly interconnecting said engine and said front wheel axle, a cooling radiator for said engine mounted within said engine compartment behind said seat and above the rear portion of said engine, plenum means for delivering air from the atmosphere without the vehicle to said cooling radiator, and a cargo carrying compartment defined in part by a forward upwardly extending wall adjacent said radiator and a floor secured to said frame and extending rearwardly of said wall.

2. In a motor vehicle, the combination as defined by claim 1 wherein an engine-driven fan is mounted adjacent said radiator to the rear thereof and said plenum means includes an air intake chamber opening in the front of said vehicle and a duct extending rearwardly through the side walls of said operator's compartment and interconnecting said chamber and said radiator.

References Cited in the file of this patent

UNITED STATES PATENTS

| | | |
|---|---|---|
| 1,724,673 | Marsh | Aug. 13, 1929 |
| 2,117,040 | Schjolin | May 10, 1938 |
| 2,133,488 | Stearns | Oct. 18, 1938 |
| 2,319,002 | Kramer | May 11, 1943 |
| 2,390,218 | Lamb et al. | Dec. 4, 1945 |
| 2,396,506 | Harris | Mar. 12, 1946 |
| 2,523,923 | Rodert | Sept. 26, 1950 |
| 2,700,428 | Nallinger | Jan. 25, 1955 |

FOREIGN PATENTS

| | | |
|---|---|---|
| 176,126 | Austria | Sept. 25, 1953 |
| 906,367 | France | May 14, 1945 |
| 331,724 | Great Britain | July 10, 1930 |
| 420,510 | Great Britain | Aug. 30, 1933 |